United States Patent
Potter et al.

(10) Patent No.: US 8,388,222 B2
(45) Date of Patent: Mar. 5, 2013

(54) DEVICE FOR INDICATING ERADICATION OF A PEST INFESTATION

(76) Inventors: Gary Joseph Potter, Marthasville, MO (US); Marc Braun, St. Louis, MO (US); Jeffrey A. Kieffer, Maryland Heights, MO (US)

( * ) Notice: Subject to any disclaimer, the term of this patent is extended or adjusted under 35 U.S.C. 154(b) by 169 days.

(21) Appl. No.: 13/023,979

(22) Filed: Feb. 9, 2011

(65) Prior Publication Data

US 2011/0196548 A1    Aug. 11, 2011

Related U.S. Application Data

(60) Provisional application No. 61/302,719, filed on Feb. 9, 2010.

(51) Int. Cl.
- G01K 3/00 (2006.01)
- G01K 1/00 (2006.01)
- G01K 13/00 (2006.01)
- G01N 25/00 (2006.01)

(52) U.S. Cl. ............ 374/104; 374/102; 374/141; 374/45

(58) Field of Classification Search .................. None
See application file for complete search history.

(56) References Cited

U.S. PATENT DOCUMENTS

| | | | |
|---|---|---|---|
| 2,114,494 A | 4/1938 | Hummel et al. |
| 2,171,315 A | 8/1939 | Rennerfeit |
| 4,953,320 A | 9/1990 | Nelson |
| 4,958,456 A | 9/1990 | Chaudoin et al. |
| 5,275,955 A | 1/1994 | Bischoff et al. |
| 5,349,778 A | 9/1994 | Chu |
| 5,678,352 A | 10/1997 | Leitner |
| 5,768,907 A | 6/1998 | Lee |
| 5,792,419 A | 8/1998 | Williamson et al. |
| 6,141,901 A | 11/2000 | Johnson et al. |
| 6,298,596 B1 | 10/2001 | Pratizzoli |

(Continued)

FOREIGN PATENT DOCUMENTS

| | | |
|---|---|---|
| DE | 3338848 | 5/1985 |
| DE | 4025828 | 2/1992 |

(Continued)

OTHER PUBLICATIONS

International Search Report and Written Opinion dated Oct. 20, 2011 from PCT/US2011/024157 (published as WO 2011/100297) which names the same inventors and claims priority to the same U.S. Appl. No. 61/302,719, filed Feb. 9, 2010, as the instant application; 9 pages.

(Continued)

Primary Examiner — Mirellys Jagan
(74) Attorney, Agent, or Firm — Harness, Dickey & Pierce, P.L.C.

(57) ABSTRACT

Exemplary embodiments of the present disclosure include devices for monitoring and indicating the completion of eradication of a pest infestation in a space in which heating is utilized for eradication. In an exemplary embodiment, a device includes a sensor configured to sense temperature proximate the device, and a visual indicator configured to provide indication of status. The device further includes a processor that is connected to the sensor and visual indicator. The processor is configured to determine whether the sensed temperature exceeds the MINIMUM LETHAL TEMPERATURE, and configured to determine occurrence of completion of a minimum heating duration required for eradication in which the sensed temperature exceeds the MINIMUM LETHAL TEMPERATURE. The processor is further configured to activate the visual indicator subsequent to completion of the minimum heating duration, to thereby provide visible indication that the minimum heating duration for eradication of a pest infestation has elapsed.

26 Claims, 8 Drawing Sheets

U.S. PATENT DOCUMENTS

| | | | |
|---|---|---|---|
| 6,327,812 | B1 | 12/2001 | Hedman et al. |
| 6,710,705 | B1 | 3/2004 | Smith et al. |
| 6,892,491 | B2 | 5/2005 | Hedman |
| 7,690,148 | B2 | 4/2010 | Hedman |
| 2002/0170227 | A1* | 11/2002 | Topp .............................. 43/124 |
| 2005/0246942 | A1* | 11/2005 | Mueller et al. .................. 43/124 |
| 2007/0084105 | A1* | 4/2007 | Lindsay et al. ................. 43/129 |
| 2009/0102600 | A1 | 4/2009 | Noe et al. |
| 2009/0199457 | A1 | 8/2009 | Grigorov et al. |
| 2010/0061053 | A1* | 3/2010 | Adkins et al. ............ 361/679.47 |
| 2010/0071258 | A1* | 3/2010 | Molnar et al. ............... 43/132.1 |

FOREIGN PATENT DOCUMENTS

| | | |
|---|---|---|
| DE | 4308585 | 9/1994 |
| DE | 4340819 | 6/1995 |
| DE | 4429850 | 2/1996 |
| DE | 19538758 | 4/1997 |
| DE | 19746026 | 6/1998 |
| EP | 0416255 | 3/1991 |
| EP | 0203326 | 8/1992 |
| EP | 0581815 | 6/1995 |
| EP | 0676138 | 10/1995 |
| EP | 0765112 | 9/1998 |
| GB | 2164140 | 3/1986 |
| GB | 2195875 | 4/1988 |
| WO | WO80/02097 | 10/1980 |
| WO | WO90/14003 | 11/1990 |
| WO | WO97/30802 | 8/1997 |
| WO | WO 2011/100297 | 8/2011 |

OTHER PUBLICATIONS

Ebeling, W., "Expanded Use of Thermal Pest Eradication (TPE)", The IPM Practitioner, Aug. 1997, XIX(8), pp. 1-8.

Ebeling, W., "Heat Penetration of Structural Timbers", The IPM Practitioner, Feb. 1994, XVI(2), pp. 9-10.

Ebeling, W., "The Thermal Pest Eradication System for Structural Pest Control", The IPM Practitioner, Feb. 1994, XVI(2), pp. 1-7.

Ebeling, W. et al., "Heat Treatment for Powderpost Beetles", The IPM Practitioner, Sep. 1989, XI(9), pp. 1-4.

Forbes and Ebeling, "Update: Use of Heat for Elimination of Structural Pests", The IPM Practitioner, Aug. 1987, IX(8), pp. 1-5.

Heaps, J., "Heat for Stored Product Insects", The IPM Practitioner, May/Jun. 1995, XVIII(5/6), pp. 18-19.

Lait and Boyer, "Termite War Heats Up in Buena Park", Los Angeles Times, Nov. 30, 1989, 1 page.

Neven and Micham, "CATTS (Controlled Atmosphere/Temperature Treatment System): A Novel Tool for the Development of Quarantine Treatments", American Entomologist, Spring 1996, pp. 56-59.

Nicholson and Von Rotberg, "Controlled Environment Heat Treatment as a Safe and Efficient Method of Pest Control", Proceedings of the Second International Conference on Urban Pests, 1996, pp. 263-265.

O'Kane and Osgood, "Studies in Termite Control", New Hampshire Agricultural Experiment Station, Department of Entomology, Apr. 1922, Bulletin No. 204, pp. 1-20.

Quarles, W., "Heat and Boric Acid in Structural IPM", The IPM Practitioner, 1995, XVII(5/6), pp. 10-11.

Quarles, W., "Pest Control Operators and Heat Treatment", The IPM Practitioner, Feb. 1994, XVI(2), p. 8.

Rust and Reierson, "Chapter 7: Use of Extreme Temperatures in Urban Insect Pest Management", Temperature Sensitivity in Insects and Application in Integrated Pest Management, Westview Press, 1998, pp. 179-200.

U.S. Department of Agriculture, Insect Control in Flour Mills, U.S. Government Printing Office, Feb. 1958, pp. 23-25.

Woodrow and Grace, "Cooking Termites in the Aloha State", Pest Control, Feb. 1997, vol. 65, Issue 2, pp. 57-59.

Zeichner, et al., "Heat and IPM for Cockroach Control", The IPM Practitioner, Feb. 1988, XX(2), pp. 1-6.

Complaint filed in the U.S. District Court of the Eastern District of Missouri, Eastern Division, dated Dec. 23, 2010, in Case No. 4:10CV2402 JCH in which the Assignee of the instant U.S. patent application is a named Plaintiff, 10 pages.

Complaint filed in the U.S. District Court of the Northern District of Illinois, dated Dec. 23, 2010, in Case No. 1:10-cv-08157 in which the Assignee of the instant U.S. patent application is a named Defendant, 4 pages.

Complaint filed in the U.S. District Court of the Northern District of Illinois, dated Jul. 28, 2010, in Case No. 1:10-cv-04724 in which the Assignee of the instant U.S. patent application was a named Defendant, 8 pages.

Order entered by the U.S. District Court of the Northern District of Illinois, dated Dec. 22, 2010, in Case No. 1:10-cv-04724 dismissing without prejudice the Assignee of the instant U.S. patent application from the suit, 20 pages.

* cited by examiner

DEVICE FOR INDICATING ERADICATION OF A PEST INFESTATION

CROSS-REFERENCE TO RELATED APPLICATION

This application claims the benefit of U.S. Provisional Application No. 61/302,719 filed Feb. 9, 2010. The entire closure of the provisional application is incorporated herein by reference in its entirety.

FIELD

The present disclosure relates to devices for monitoring extermination treatments for eradication of a pest infestation within a space.

BACKGROUND

This section provides background information related to the present disclosure which is not necessarily prior art.

Hotels have people check in from all walks of life. Some hotel guests bring additional uninvited/unwanted guests with them that stay beyond check out time, such as bedbugs, among other insects. Cities with large numbers of hotel rooms oftentimes report bedbug infestations, such as Las Vegas, New York City, and Hawaii. The bedbugs arrive on a few hotel guests or their luggage and then the environment of the hotel allows the bedbugs to thrive. The bedbugs affect hotels of all star levels.

In recent years, hotels have fought the bedbugs in various ways. One prior art method of fighting bedbugs involves heated air. The heated air raises the space temperature high enough to kill off the bedbugs. The heated air is readily created by direct fired heaters, propane heaters or burners. Such heaters are presently used at construction sites and along the sidelines at wintry professional football games. The heaters generally burn propane and a fan drives air over the burner for heating. But exterminators may use heated air to eliminate bedbugs, though the exterminators are usually not allowed to bring propane tanks into buildings due to fire and building codes.

Additionally, hotel general managers and property owners seek to handle the bedbug infestation highly discretely and very quietly. The propane heaters move the heated air through a flexible duct system to reach the infested space. But flexible ducts running up the stairs and down the corridors in five star hotels are just not permitted. Additionally, re-circulating air from a direct fired heater within an infested space or nearby hallway also is not allowed because the combustion products can rise to unsafe levels rapidly.

In order to avoid the fire and building code limits and direct fired heaters, hotels commonly attack bedbug infestations by stripping a room of its furnishings down to the structure, often bare concrete. This extreme method kills off a bedbug infestation, but a hotel loses room night revenue and incurs the demolition and re-fitting costs. Indeed, this method may cost over $30,000 (USD) per room.

Exterminating contractors presently fight bedbugs with various systems, including direct fired heaters coupled with flexible ducts to deliver heated air to an infested space. The heaters may be gas-fired salamanders in conjunction with flexible ducts that deliver hot air into a room or other part of a building, enclosure, container or structure, to exterminate bedbugs therein.

When generating heat to kill off an infestation of unwanted insects, small mammals or other pests, an infra-red heating system can serve as the source of the heat. Infra-red heat is generally classified as low intensity (lower temperature and longer wavelength) or high intensity (higher temperature and shorter wavelength) based on the temperature output of the black body. High intensity is more reflective of the energy produced with light colored walls returning it to the space for absorption by darker colored objects. Low intensity tends to have more of its energy absorbed into a wall even with light colored paint coatings. The absorbed energy then is conducted to the wall cavity. In a bug-infested wall, the temperature inside the wall must rise to the killing temperature. The low intensity infra-red heat serves that purpose well. The walls subjected to the infra-red heating also radiate heat back to the space and raise the air temperature accordingly.

It has been reported in the prior art that temperatures as low as 115° F. can be lethal to bedbugs. But the exposure time to actually achieve the kill can approach 10 hours. On the other hand, bedbug exposure to a temperature of 140° F. can accomplish the kill within a half hour. Other pests, such as scorpions, require higher temperature profiles to reach the lethal temperature exposure.

Exterminators that utilize heat as a means to eradicate a pest infestation have been known to leave the jobsite after the equipment has been set up and the heating cycle has begun, thereby, leaving the system unmanned in order to minimize (or at least reduce) labor expenses. By not continuously monitoring the process, they have no way to know whether any malfunctions (e.g., power interruptions) occurred during their absence. Therefore, they tend to extend the cycle time well beyond what is needed and may occasionally have to repeat the treatment if something did occur. Both conditions needlessly waste energy and other resources.

SUMMARY

This section provides a general summary of the disclosure, and is not a comprehensive disclosure of its full scope or all of its features.

Exemplary embodiments of the present disclosure include devices for indicating the eradication of a pest infestation. An exemplary embodiment of a device for indicating eradication of a pest infestation generally includes a sensor configured to sense the temperature proximate to the device and to provide a signal indicative of the sensed temperature. The device further includes a visual indicator configured to provide an indication of status. The device further includes a processor connected to the sensor, which is configured to determine whether the sensed temperature exceeds a minimum lethal temperature. The processor is further configured to determine when completion has occurred of a minimum heating duration during which the sensed temperature exceeds the minimum lethal temperature. The processor is further configured to activate the visual indicator subsequent to completion of the minimum heating duration, to thereby provide a visible indication that the minimum heating duration required for eradication of a pest infestation has elapsed.

In an exemplary embodiment, the processor is configured to determine when completion of a minimum heating duration for eradication has occurred, by determining a count value that is based on the sensed temperature value received from the sensor, and by determining when a sum of the count values has reached a predetermined minimum count required for eradication of the pest infestation. In another exemplary embodiment, the processor is configured to determine when completion of a minimum heating duration for eradication has occurred, by determining whether a predetermined period of time has elapsed in which the sensed temperature exceeds the minimum lethal temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
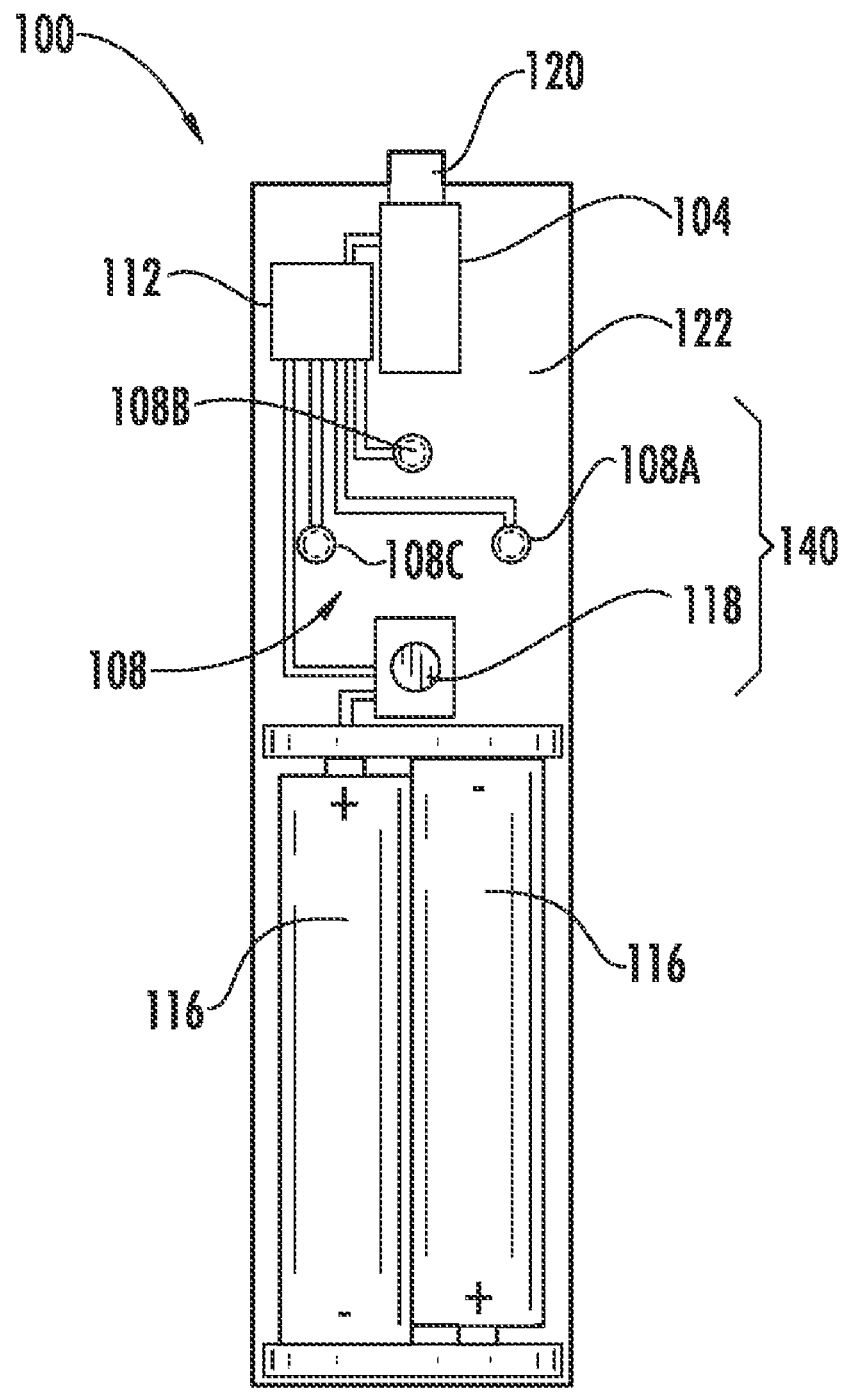
FIG. 1 illustrates an exemplary embodiment of a device for indicating eradication of a pest infestation, in accordance with the present disclosure.
Figure 2:
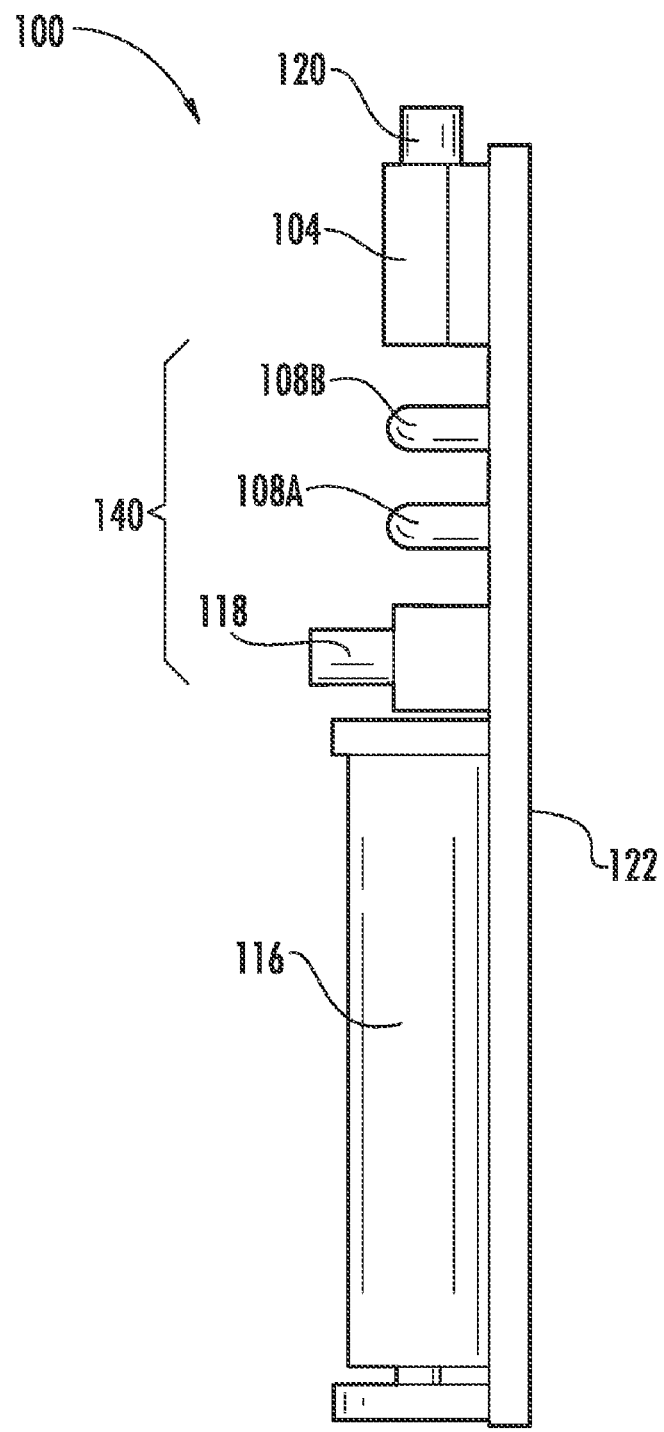
FIG. 2 shows a side view of the embodiment in FIG. 1.

Example embodiments will now be described more fully with reference to the accompanying drawings.

Disclosed herein are various embodiments of devices for indicating the eradication of a pest infestation. Exemplary embodiments of insect, small mammal, or other pest fatality indicating devices relate to measuring the temperature of an area of a heated room or container and the time duration at each temperature during the heating cycle to determine whether the combination of heat and time conditions have been met to eradicate an infestation of insects and their larvae, small mammals, or other pest, and then confirm the results to an operator.

In an exemplary embodiment, the device includes a sensor that is configured to sense the temperature proximate the sensor's surroundings, and to provide a signal that is indicative of the sensed temperature. The device further includes a visual indicator that is configured to provide a visible indication of status. The device further includes a processor, microprocessor or other suitable controller, which is connected to the sensor and the visual indicator. The processor is further configured to determine whether the sensed temperature exceeds the MINIMUM LETHAL TEMPERATURE, and configured to determine whether completion has occurred of a minimum heating duration required for eradication during which the sensed temperature exceeds the MINIMUM LETHAL TEMPERATURE. Subsequent to determining the occurrence of the minimum heating duration for eradication, the processor is configured to activate the visual indicator to thereby provide a visible indication that the minimum heating duration required for eradication of a pest infestation has elapsed.

In some exemplary embodiments, the processor may be configured to track the sensed temperature and the time in which the sensed temperature is at or above a MINIMUM LETHAL TEMPERATURE level. The processor is configured to determine when the completion of a minimum heating duration for eradication has occurred or elapsed, by determining whether a predetermined period of time has elapsed in which the sensed temperature exceeds the MINIMUM LETHAL TEMPERATURE. The predetermined period of time in which the sensed temperature must exceed the MINIMUM LETHAL TEMPERATURE may vary depending upon the type of pest infestation, and may be a time period between about one-half hour to about ten hours, depending on the extent that the sensed temperature exceeds the MINIMUM LETHAL TEMPERATURE. In other exemplary embodiments, the processor is configured to determine when the completion of a minimum heating duration for eradication has occurred or elapsed, by determining from each sensed temperature received from the sensor a count value that is based on the sensed temperature value, and by determining when a sum of the count values has reached a predetermined minimum count that may be required for eradication of a particular pest infestation.

Accordingly, various embodiments are disclosed that overcome prior heating extermination problems by providing an insect, small mammal, or other pest fatality indicating device that tracks temperature and duration of heating for raising room and wall temperatures to remove insect, small mammal, or other pest (e.g., scorpions, etc.) infestations. The device indicates when the infestation has been removed and heating may be stopped, to thereby lessen damage to wall finishes and structures. The device monitors the time duration that the sensed temperature is above a MINIMUM LETHAL TEMPERATURE, and may further weight the temperature for a prescribed segment of time to define a count value, and then accumulate the counts until a sum is reached. The sum represents a predetermined minimum time at a sufficient temperature effective to kill the pests that afflict present day buildings, such as bedbugs, termites, other insects, insect larvae, small mammals (e.g., field mice, ground squirrels, bats, etc.), other pests (e.g., scorpions, etc.), etc.

Numerous aspects, features, and advantages of the present disclosure will be readily apparent from the following detailed description of the embodiments, when taken in conjunction with the accompanying drawings.

One aspect of the present disclosure relates to a new and improved device that detects when insects, small mammals, or other pests have been subjected to lethal temperatures for a sufficient time to kill or remediate the infestations through the use of heat over an extended time.

Another aspect of the present disclosure relates to a detecting device that senses the temperature near the device using an external sensor.

Another aspect of the present disclosure relates to a detecting device that senses the temperature near the device using an internal sensor.

Another aspect of the present disclosure relates to a detecting device that tracks the time at a given temperature.

Another aspect of the present disclosure relates to a detecting device that evaluates the temperature and the time at a certain temperature.

Another aspect of the present disclosure relates to a detecting device that tracks the progress of temperature and time at a temperature towards a goal of a minimum time and temperature.

Another aspect of the present disclosure relates to an algorithm or program function that assigns a count weight to temperatures within the kill range for a particular pest infestation over a given segment of time and then accumulates the count values until a predetermined sum is reached.

Another aspect of the present disclosure relates to an onboard display that shows the current temperature and current count total, and also shows an estimated time to completion based on the current temperature.

Another aspect of the present disclosure relates to a detecting device that allows for reprogramming via an external means.

Another aspect of the present disclosure relates to wirelessly transmitting the information collected by the device to a modem, to thereby permit remote monitoring in real time of the progress of pest remediation activity.

The various disclosed embodiments provide for tracking the actual temperature within a room, enclosure or container subject to eradication heating, and the time duration at a lethal temperature during a bug killing operation. By utilizing this device, the operator can be confident that the bug extermination was successful because the temperature can be monitored in hard to reach places and wall cavities where bedbugs may be hiding.

Another aspect of the present disclosure relates to weighting time intervals based upon the temperature, and assigning a count value where after attaining a certain count total, the space is indicated as being bug free. The count weight increases with temperatures over 115° F. with the goal of reaching the predetermined minimum count total for removing an infestation, while causing the least thermal damage to a space.

With reference now to the figures, FIG. 1 illustrates a first exemplary embodiment of a device 100 for indicating the eradication of a pest infestation. The device 100 includes a sensor 104 that is configured to sense the temperature proximate the sensor 104, and to provide a signal that is indicative of the sensed temperature. The device 100 further includes a visual indicator 108 that is configured to provide a visible indication of operation, such as the status of the eradication process, for example.

The device 100 further includes a processor, microprocessor, or other suitable controller. The processor is preferably a microprocessor 112 that is programmable so as to be configured to receive an input of a signal from the sensor 104 that is indicative of sensed temperature, and configured to determine whether the sensed temperature exceeds a MINIMUM LETHAL TEMPERATURE. The microprocessor 112 is further configured to determine when a minimum heating duration, during which the sensed temperature exceeds the MINIMUM LETHAL TEMPERATURE, has been completed to achieve eradication of the pest infestation.

In the first embodiment, the microprocessor 112 may be configured to determine when completion of a minimum heating duration occurs by determining from each sensed temperature received from the sensor 104 a count value that is based on the sensed temperature value, and by determining when a sum of the count values has reached a predetermined minimum count required for eradication of the pest infestation. Alternatively, the microprocessor 112 may be configured to determine when completion of a minimum heating duration occurs by determining whether a predetermined period of time has elapsed in which the sensed temperature exceeds the MINIMUM LETHAL TEMPERATURE. The MINIMUM LETHAL TEMPERATURE and/or predetermined period of time in which the sensed temperature exceeds the MINIMUM LETHAL TEMPERATURE may vary depending upon the type of pest infestation. By way of example only, the predetermined period of time in which the sensed temperature exceeds the MINIMUM LETHAL TEMPERATURE may be between about one-half hour to about ten hours, etc., depending on the extent that the sensed temperature exceeds the MINIMUM LETHAL TEMPERATURE. The microprocessor 112 is also configured to activate the visual indicator 108 such that a visible indication is provided that the minimum heating duration required for eradication of a pest infestation has elapsed subsequent to completion of the minimum heating duration. The above described elements and other components of the device 100 for indicating eradication of a pest infestation are also described below.

With continued reference to FIG. 1, the sensor 104 of device 100 is operable for detecting the temperature proximate to the sensor 104 and/or device 100 and for converting the sensed temperature into an electrical signal indicative of the sensed temperature. The sensor 104 can be a thermometer, thermistor, or the like, that provides an indication of temperature within the range of 40° Fahrenheit to 250° Fahrenheit (or other suitable temperature range).

Generally, the sensor 104 is configured to sense the temperature near the device 100 to within one degree Fahrenheit, to correlate with the change in count values at each degree of temperature, as described later in Table I below. While the sensor 104 shown in FIG. 1 is located on the device 100, the device 100 may also or alternatively include a connection port 120 that receives a remote temperature sensing probe 106 or a connector lead 102 of a remote temperature sensing probe 106 (shown in FIG. 3), such that a remote sensor may be used with the device 100.

The visual indicator 108 of device 100 is operable or configured to provide a visible indication of status. The visual indicator 108 may comprise one or more light emitting devices that emit one or more colors, such as a light emitting diode (LED). But fiber optics, small scale incandescent bulbs, other indicators or light sources may alternatively be used in other embodiments. In this example, the visual indicator 108 includes light emitting devices that emit different colors, such as a red light 108A, a yellow light 108B, and a green light 108C, for example. Alternatively, the visual indicator may comprise a single LED that is capable of selectively emitting a red, a yellow/amber, and a green light, such as a LT2462-24-D51 series LED manufactured by Ledtech, for example.

The microprocessor 112 is further configured to control actuation of the one or more light emitting devices or lights, to provide an indication of when the sensed temperature reaches the MINIMUM LETHAL TEMPERATURE, or a certain count value or predetermined time duration that is indicative of when a minimum heating duration is reached. Actuation of a certain color LED may provide indication of a specific status or operation level, and one or more colors may correspond to different states of eradication.

In addition to the sensor 104 and the visual indicator 108, the device 100 may further include a printed circuit board 122. As shown in FIG. 1, the sensor 104 and visual indicator 108 are disposed or located on the printed circuit board 122. The printed circuit board 122 preferably provides for connecting the microprocessor 112, the sensor 104, and the visual indicator 108, and may also serve as a mounting surface for various other components, as explained below.

The device 100 may further include a switch device or on/off/reset button 118, which may be generally located in the center of the device 100. With the on/off/reset button 118 in the on position, electrical power is applied to the microprocessor 112. The on/off/reset button 118 is further configured to interrupt application of electrical power to the microprocessor 112 to reset the microprocessor 112. The device 100 may be configured to include the on/off/reset button 118 and/or visual indicator 108 within a specific portion of the device 100 that functions as a control panel 140, as shown in FIG. 1. The control panel 140 provides a user-interface area within which the visual indicator 108 may be easily viewed. The control panel portion 140 also allows a user to access the on/off/reset button 118 that connects a power source, which may be a battery or other suitable power source as described below.

The device 100 operates using an electrical power source that may comprise at least one battery 116 or other suitable power source. In the illustrated example of FIG. 1, the device 100 includes two batteries 116 generally connected in series. The batteries 116 may preferably be the size of AA batteries, though other customary size batteries and other power sources may be used in other embodiments. The batteries 116 are configured to apply power or voltage to the microprocessor 112 via the on/off/reset button 118. Electrical connection between the batteries 116 and the on/off/reset button switch 118 may be established via the printed circuit board 122.

Figure 3:
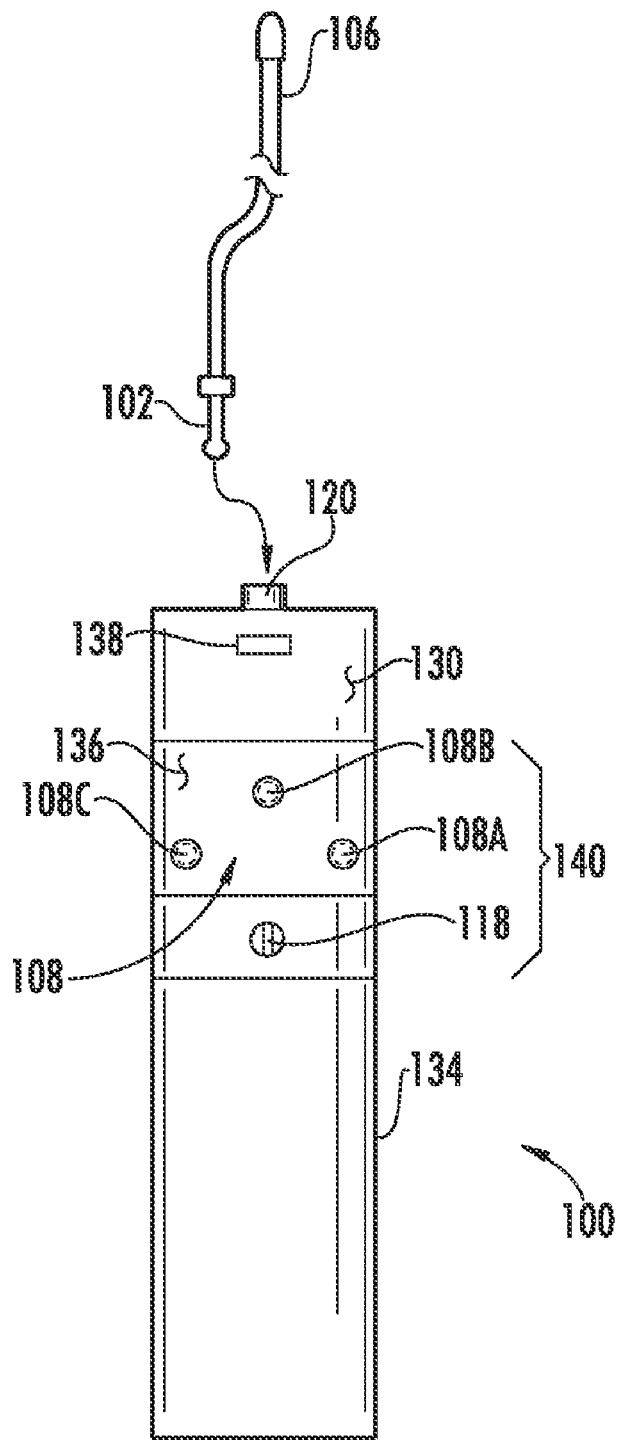
FIG. 3 shows a top view of the embodiment in FIG. 1 with a cover.

As shown in FIG. 3, the device 100 may be configured to include one or more battery terminals secured to the printed circuit board 122, where the batteries 116 may be releasably retained between the one or more battery terminals. The battery terminals are preferably configured to establish an electrical connection of the batteries 116 through the printed circuit board 122 to the on/off/reset button switch 118. The printed circuit board 122 accordingly provides for retaining the batteries 116, which may be disposed generally parallel to the length of the device 100. The batteries 116 can be non-rechargeable or rechargeable. For example, non-rechargeable batteries, such as alkaline, can be used to power the device. The device 100 preferably uses minimal (or at least reduced) power, such that each non-rechargeable battery 116 may have a minimum lifespan of approximately 12 months during normal usage, with a preferred lifespan of at least 2 years during normal usage throughout the device's operating temperature range. Alternatively, a rechargeable battery 116 with a five year lifespan may be used and recharged from time to time. After removing the rechargeable batteries 116 from the device, the batteries 116 may be recharged in a charger (not shown) and recharged to an acceptable level. Alternatively, the rechargeable batteries 116 may be recharged via a charger configured to plug into a battery charge jack (see 128 in FIG. 4) provided on the device 100. The battery charge jack 128 allows for connection of transformed electrical power to the device 100 for charging an onboard battery.

With either non-rechargeable or rechargeable batteries, the device 100 may be configured to permit replacement of the batteries 116. For example, FIG. 3 illustrates the device 100 having a case or cover 130. The device 100 may further include a removable portion 134, with the batteries 116 located beneath the removable portion 134. Removal of the removable portion 134 allows each non-rechargeable battery 116 to be readily replaced. The cover 130 is also configured to allow a user to access the on/off/reset button 118. The cover 130 may further include a panel or a portion 136 that is transparent, or at least translucent, to allow a user to view the status of the visual indicator 108, which may comprise one or more light emitting devices. The cover 130 may further enclose at least a portion of the sensor 104, and may include at least one opening 138 proximate the sensor 104, to allow ambient air to pass through the at least one opening 138. The opening 138 permits the sensor 104 to sense the temperature of air proximate the device 100. In an alternate construction, the sensor 104 may physically contact the interior of the cover 130, where the cover material is configured to allow thermal conduction therethrough, to permit sensing temperature proximate the device 100. The cover 130 may also be configured to be secured firmly to the printed circuit board 122 of the device 100, to enclose the device 100 as a unit. In yet another alternate construction, the sensor may be a remote temperature probe 106 that depends from the cover 130, and is connected via a plug-in jack 102 to a connector port 120 on the device 100 that connects the remote sensor probe 106 and the microprocessor 112.

Figure 4:
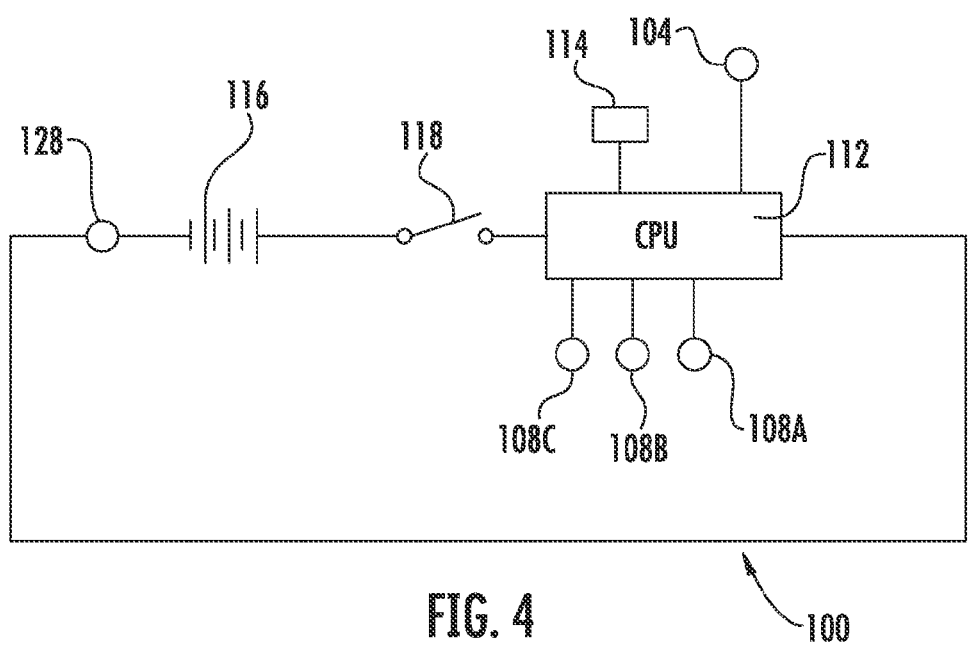
FIG. 4 illustrates a circuit diagram of the embodiment in FIG. 1.

Referring to FIG. 4, a schematic diagram of the device 100 is shown. The device 100 includes a processor, microprocessor or other suitable controller for the device 100, which in the illustrated embodiment comprises a microprocessor 112. The microprocessor 112 is connected to the sensor 104, the visual indicator 108, and the on/off/reset button switch 118. The microprocessor 112 is configured to periodically receive (or retrieve) from the sensor 104 a signal that is indicative of the sensed temperature proximate the device 100. The microprocessor 112 is preferably programmable so as to be configured to determine whether the sensed temperature exceeds the MINIMUM LETHAL TEMPERATURE. In the context of this disclosure, MINIMUM LETHAL TEMPERATURE is defined as a sufficient temperature that is effective to exterminate or kill a particular bug or pest. While the MINIMUM LETHAL TEMPERATURE may vary depending upon the type of pest infestation, this temperature may be as little as 115° F. for purposes of implementation. The microprocessor 112 is further configured to determine the occurrence of the completion of a minimum heating duration required for eradication in which the sensed temperature exceeds the MINIMUM LETHAL TEMPERATURE. The microprocessor 112 may be configured to determine when completion of a minimum heating duration has occurred by determining, with each sensed temperature periodically received from the sensor 104, a count value that is based on the sensed temperature value, and by determining when a sum of the count values has reached a predetermined minimum count required for eradication. For example, the microprocessor 112 may include an algorithm that assigns a weight factor based on the sensed temperature, which is used in calculating a count value for each segment of time in which a sensed temperature is received. The microprocessor 112 is thereafter configured to sum all of the count values for each segment of time, until a predetermined count value (e.g., ACCUMULATED TOTAL COUNT) is reached. Where the device 100 is configured or used specifically for bedbugs, the predetermined count value or ACCUMULATED TOTAL COUNT required is about 720. But other predetermined count values could be selected if the weight factor is properly aligned as it relates to the minimum time required at a specific temperature to achieve lethal results for the type of insect, small mammal, or other pest involved in the infestation. The microprocessor 112 may also be configured to track the summed count value, and to activate the visual indicator 108 (such as by turning on or blinking a light emitting device) during operation at certain count sum values. The device 100 may further comprise an electronic memory 114 associated with the microprocessor 112 for accumulating or storing data. For example, the microprocessor 112 may be configured to store a sum of the count values in the electronic memory 114 in a manner such that each time a sensed temperature is received from the sensor 104, the microprocessor 112 determines a present count value associated with the sensed temperature and thereafter determines an updated sum of the present count value and a previously stored sum, which updated sum is stored in the electronic memory 114. It should be noted that the electronic memory 114 may be a component separate from the microprocessor 112, or may be a memory or register database contained within the microprocessor 112 itself.

Alternatively, the microprocessor 112 may be configured to determine when completion of a minimum heating duration has occurred, by determining whether a predetermined period of time has elapsed in which the sensed temperature exceeds the MINIMUM LETHAL TEMPERATURE. The predetermined period of time in which the sensed temperature must exceed the MINIMUM LETHAL TEMPERATURE may vary depending upon the type of pest infestation, and may be a time period between about one-half hour to about ten hours (or other suitable time period) depending on the extent that the sensed temperature exceeds the MINIMUM LETHAL TEMPERATURE. Upon determining when completion of a minimum heating duration has occurred, the microprocessor 112 is configured such that the visual indicator 108 is activated, to thereby provide a visible indication that the minimum heating duration required for eradication of a pest infestation has elapsed.

In addition to determining when eradication is complete, the microprocessor 112 may be further configured to perform other functions, as described below. When electrical power is applied to the microprocessor 112, the microprocessor 112 may be configured to activate the visual indicator 108 (such as by turning on a red light emitting device that remains lit for thirty seconds) to indicate that the device 100 has been set to a sleep mode. If battery power is low, the microprocessor 112 may be configured to activate the visual indicator 108 (such as by repeating a cycle of blinking a yellow light emitting device three times followed by a three second pause) to signal a LOW BATTERY condition, which indicates battery power is limited to less than twelve hours.

Figure 5:
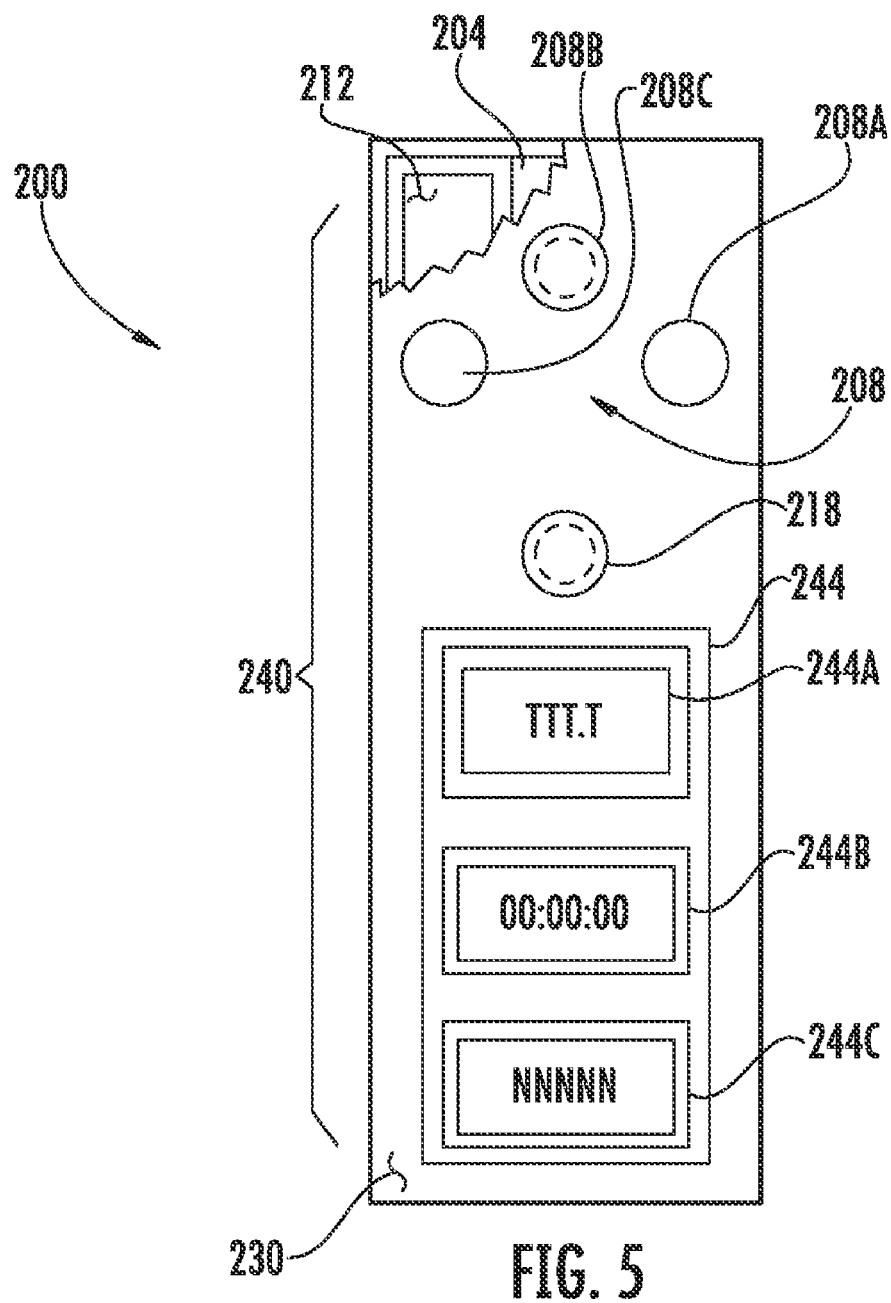
FIG. 5 illustrates a second exemplary embodiment of a device for indicating eradication of a pest infestation, which device also provides for display of additional information, in accordance with the present disclosure.
Figure 6:
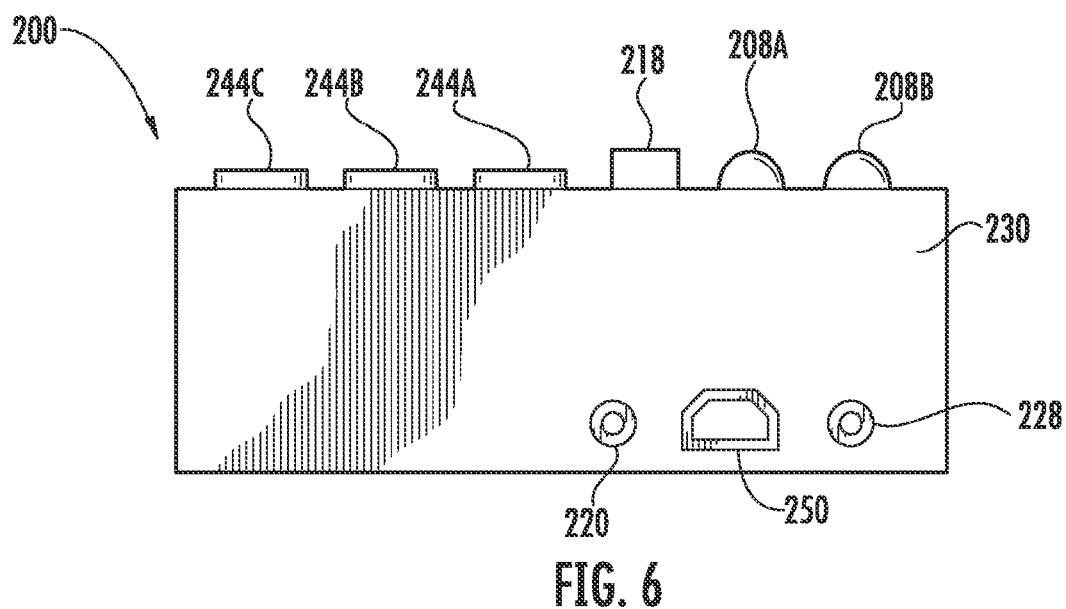
FIG. 6 shows a side view of the embodiment in FIG. 5.
Figure 7:
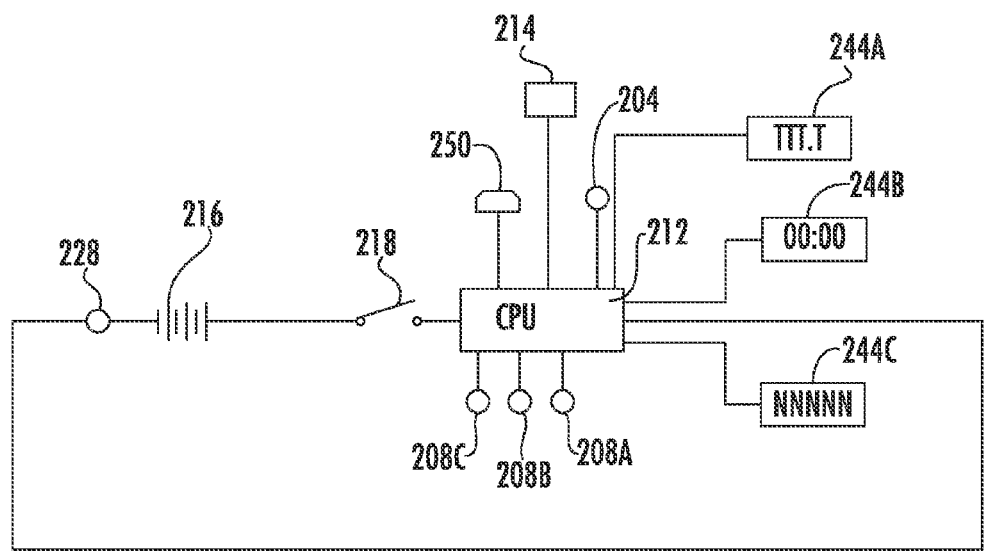
FIG. 7 illustrates a circuit diagram of the embodiment in FIG. 5.

Referring to FIGS. 5-7, a second embodiment of a device for indicating eradication of a pest infestation is shown generally at 200. The device 200 is similar in construction to the device 100 of the first embodiment. For example, the device 200 also includes a sensor 204 for sensing temperature proximate the device 200 and a visual indicator 208. The visual indicator 208 may comprise, for example, one or more light emitting elements 208A, 208B, 208C. The sensor 204 may be a remote temperature probe that connects via a plug-in jack to a connector port.

The device 200 further includes a microprocessor 212 configured to periodically receive from the sensor 204 a signal that is indicative of the sensed temperature. The microprocessor 212 is further configured to determine the occurrence of a sensed temperature that exceeds a MINIMUM LETHAL TEMPERATURE, and the completion of a minimum heating duration for eradication during which the sensed temperature exceeds the MINIMUM LETHAL TEMPERATURE.

The device 200 may further comprise a cover 230 and a portion thereof that defines or functions as a control panel 240. The control panel 240 may include a combined on/off/reset button switch 218, for selectively switching electrical power from one or more batteries 216 (FIG. 7) to the microprocessor 212 to initialize the device 200. The visual indicator 208 may be included within the control panel 240 or as part of the control panel 240, to inform an operator or user of the device 200 about the status of operation.

The control panel 240 may further include other indication means for displaying additional information. For example, the control panel 240 may further include a display device 244 (FIG. 5) as part of, or in addition to, the visual indicator 208. As the device 200 determines sensed temperatures and durations, the microprocessor 212 may be configured to communicate to and control the display device 244 to display the actual sensed temperature at 244A. The microprocessor 212 may be configured to communicate to and control the display device 244 to display a clock or time indication at 244B. The display device 244 preferably displays a clock or time indication to provide for display of an elapsed time in hours, minutes, and seconds, since the sensed temperature reached or exceeded the MINIMUM LETHAL TEMPERATURE. The microprocessor 212 may be configured to communicate to and control the display device 244 to display a readout of a sum of the determined count values at 244C. The sum of the determined count values, or the ACCUMULATED TOTAL COUNT, reflects the sensed temperature value and/or duration based on an associated count weight factor that is used in determining the count value. The display device 244 preferably is a liquid crystal display, but may alternatively comprise a plurality of separate discrete components for individually displaying the temperature, time, and count information. For example, the ACCUMULATED TOTAL COUNT could be displayed by itself on a counter having a display comprising light emitting diodes or other means for displaying numerical characters. Likewise, the elapsed time could be displayed by a clock component having a display comprising light emitting diodes or other means for displaying numerical characters.

Referring to FIG. 7, the microprocessor 212 may also be connected to, or in communication with, an electronic memory 214, and a programming jack 250. The device 200 may have a programming jack 250, such as a USB jack, which allows for connection of a computer cable for transmission of programming instructions to the microprocessor 212. The programming jack 250 has either an external jack interface or a set of pins, which may be accessible by removing a removable portion, for example. The programming jack 250 may also allow for communication of sensor calibration data for calibrating the sensor 204 against a series of known temperatures at the time and place of manufacture. For example, the device 200 and/or sensor 204 may be calibrated to 125° F. within a tolerance of 1° F. The device 200 may also include a battery charge jack 228 that allows for connection of transformed electrical power to the device 200 for charging the one or more batteries 216.

Figure 8:
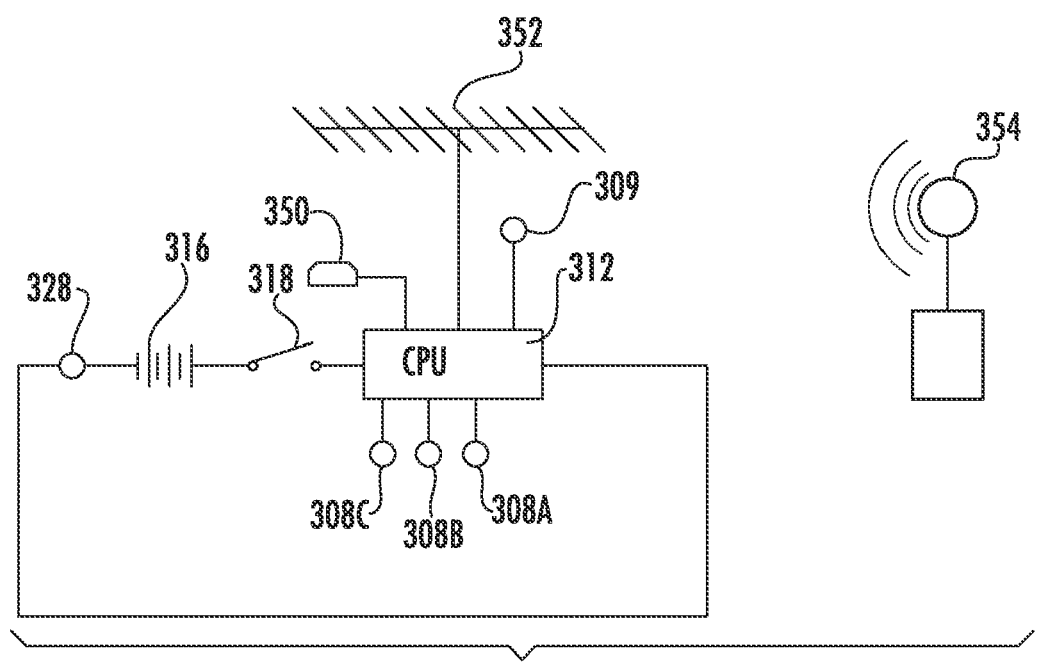
FIG. 8 illustrates a third exemplary embodiment of a device for indicating eradication of a pest infestation, which device also includes a transmitter device, in accordance with the present disclosure.

Referring to FIG. 8, a third embodiment of a device for indicating eradication of a pest infestation is shown generally at 300. The device 300 is similar in construction to the devices 100 and 200 of the respective first and second embodiments. For example, and as shown in FIG. 8, the device 300 also includes a microprocessor 312 connected to a sensor 304 and visual indicator 308A, 308B, 308C. The device 300 further includes a transmitter and/or antenna 352 configured for wireless transmission. The transmitter and/or antenna 352 is preferably coupled to the microprocessor 312, which may communicate information to be transmitted, such as a current sensed temperature, a current sum of the count values, and/or an estimated time for completion of the eradication process based on the collected data. The device 300 including the transmitter and/or antenna 352 can allow for transmitting temperature and time duration information collected by the device 300 to an external modem 354, thus allowing for supply of the data to the internet for remote monitoring purposes. The device 300 may further include an electronic memory 314 for storing collected data, and also a battery charge jack 328 that allows for connection of external power for charging a battery 316.

Having described the various exemplary embodiments and components thereof, an exemplary manner of operation for indicating eradication will now be described. While the manner of operation is described below with respect to the device 100 of the first embodiment, the following description of operation is also applicable to other embodiments (e.g., 200, 300, etc.). Operation of the device 100 begins with a user depressing the ON/OFF/RESET button 118 for five seconds to turn on the device 100. After electrical power is applied to the microprocessor 112, the microprocessor 112 may activate a visual indicator 108, such as by turning on a light emitting device of a particular color that remains lit for thirty seconds, for example. If battery power is low, the microprocessor 112 may also activate a visual indicator 108, such as repeating a cycle of blinking a light emitting device three times followed by a three second pause, for example, to signal a LOW BATTERY condition. The LOW BATTERY condition indicates that battery power is limited to less than twelve hours. Such a low battery warning will end once the microprocessor 112 of the device 100 enters the sleep mode, which is described below.

The microprocessor 112 is preferably configured to automatically initiate a sleep mode thirty seconds after the ON/OFF/RESET button 118 is initially held for five seconds to start the device 100, or after the ON/OFF/RESET button 118 is momentarily depressed in the middle of an operating cycle. The sleep mode conserves electrical power of the battery 116, so that the device 100 may operate as long as possible, particularly in situations where the device 100 is placed in a space at a low remediation temperature for an extended duration, such as below 120° F. for over two hours. In the sleep mode, the microprocessor 112 may be configured to at least intermittently deactivate the visual indicator 108. Where the visual indicator 108 comprises a light emitting device, such as a red LED for example, the microprocessor 112 may deactivate the red LED in sleep mode to conserve power. The microprocessor 112 still retains the status function of the light emitting device, and may be configured to pulse or blink the red LED every ten seconds, for example.

The microprocessor 112 may be configured to awake from sleep mode when a user momentarily depresses the ON/OFF/RESET button 118 while in sleep mode. When the device 100 awakes from sleep mode, the status of the visual indicator 108 reverts back to the status indication exhibited before sleep mode was initiated. While the device 100 is on, momentarily depressing the ON/OFF/RESET button 118 will cause the microprocessor 112 to activate the visual indicator 108 again. The microprocessor 112 is configured to activate the visual indicator 108 to indicate an initial start-up status as long as the sensed temperature has not yet reached a MINIMUM LETHAL TEMPERATURE. Where the visual indicator 108 comprises a light emitting device, such as a red LED for example, the microprocessor 112 may activate the red LED to provide continuous illumination for thirty seconds, for example, to indicate an initial start-up status. Momentarily depressing the ON/OFF/RESET button 118 also repeats the LOW BATTERY indication, if the battery power remains low. Where the visual indicator 108 comprises a light emitting device, such as a red LED for example, the microprocessor 112 may activate the red LED to continuously blink every ten seconds until the temperature increases to the MINIMUM LETHAL TEMPERATURE or until the device 100 is turned OFF by manually depressing ON/OFF/RESET button 118 for five seconds. The resetting of the counter dumps historical information from the microprocessor 112 of the device 100.

When the sensed temperature proximate the device 100 exceeds the MINIMUM LETHAL TEMPERATURE, the microprocessor 112 may be configured to activate the visual indicator 108, to provide an indication of reaching the MINIMUM LETHAL TEMPERATURE. Where the visual indicator 108 comprises one or more light emitting devices, such as a red LED and/or yellow LED for example, the microprocessor 112 may be configured to turn off an illuminated red LED, and activate or turn on the yellow LED, for example, to provide an indication of a change from start-up status to the status of reaching the MINIMUM LETHAL TEMPERATURE. After the sensed temperature has reached or exceeded the MINIMUM LETHAL TEMPERATURE, the microprocessor 112 is further configured to determine or calculate, in each segment of time in which a sensed temperature is received, a count value using a count weight factor based on the sensed temperature value. Once the count value is determined, the microprocessor 112 may be configured to store a sum of the count values in the electronic memory 114 in a manner such that with every sensed temperature received, the microprocessor 112 determines an updated sum of the present count value and a previously stored sum, which is stored in the memory 114. For example, where the sensed temperature is periodically read or received every ten seconds, an associated count value is determined using a count weight that is based on the sensed temperature. As the sensed temperature increases above the MINIMUM LETHAL TEMPERATURE with continued eradication heating, the count weight may change, for example, according to Table I below.

TABLE I

Count Weight
(Bedbugs)
Count Every 10 Seconds

| Temp (° F.) | Count Weight | Specified Count Total |
|---|---|---|
| Below 116 | 0 | |
| 116 | 0.2 | 720 |
| 117 | 0.4 | 720 |
| 118 | 0.6 | 720 |
| 119 | 0.8 | 720 |
| 120 | 1.000 | 720 |
| 121 | 1.062 | 720 |
| 122 | 1.143 | 720 |
| 123 | 1.250 | 720 |
| 124 | 1.333 | 720 |
| 125 | 1.412 | 720 |
| 126 | 1.500 | 720 |
| 127 | 1.581 | 720 |
| 128 | 1.791 | 720 |
| 129 | 1.905 | 720 |
| 130 | 2.000 | 720 |
| 131 | 2.222 | 720 |
| 132 | 2.500 | 720 |
| 133 | 2.791 | 720 |
| 134 | 3.158 | 720 |
| 135 | 3.333 | 720 |
| 136 | 3.636 | 720 |
| 137 | 4.138 | 720 |
| 138 | 4.800 | 720 |
| 139 | 5.455 | 720 |
| 140 | 6.000 | 720 |

TABLE II

Count Weight
(Scorpions)
Count Every 10 Seconds

| Temp (° F.) | Count Weight | Specified Count Total |
|---|---|---|
| Below 146 | 0 | |
| 146 | 0.2 | 1440 |
| 147 | 0.4 | 1440 |
| 148 | 0.6 | 1440 |
| 149 | 0.8 | 1440 |
| 150 | 1.000 | 1440 |
| 151 | 1.062 | 1440 |
| 152 | 1.143 | 1440 |
| 153 | 1.250 | 1440 |
| 154 | 1.333 | 1440 |
| 155 | 1.412 | 1440 |
| 156 | 1.500 | 1440 |
| 157 | 1.581 | 1440 |
| 158 | 1.791 | 1440 |
| 159 | 1.905 | 1440 |
| 160 | 2.000 | 1440 |
| 161 | 2.222 | 1440 |
| 162 | 2.500 | 1440 |
| 163 | 2.791 | 1440 |
| 164 | 3.158 | 1440 |
| 165 | 3.333 | 1440 |
| 166 | 3.636 | 1440 |
| 167 | 4.138 | 1440 |
| 168 | 4.800 | 1440 |
| 169 | 5.455 | 1440 |
| 170 | 6.000 | 1440 |

From the determination of a count weight and count value associated with a sensed temperature reading within a given time increment, the count value is added to the stored sum of count values, or the ACCUMULATED COUNT TOTAL. The sum of all the determined count values will advance the ACCUMULATED COUNT TOTAL towards a PREDETERMINED MINIMUM COUNT value or MINIMUM TIME. Once the sensed temperature exceeds the MINIMUM LETHAL TEMPERATURE and start of eradication counting begins, the microprocessor 112 will provide an indication of the start of the eradication duration by continuously activating the visual indicator 108 (such as by illuminating a yellow light emitting diode for thirty seconds, for example). After thirty seconds, the microprocessor 112 may be configured to return to sleep mode, as explained below.

After reaching the MINIMUM LETHAL TEMPERATURE but before the ACCUMULATED TOTAL COUNT meets the MINIMUM COUNT VALUE, the device 100 will return to sleep mode after 30 seconds transpire or the ON/OFF/RESET button 118 is momentarily depressed. Upon setting or returning to the sleep mode, the microprocessor 112 is configured to deactivate the visual indicator 108 to conserve electrical power of the battery 116. Where the visual indicator 108 comprises a yellow light emitting device for indicating a sensed temperature above the MINIMUM LETHAL TEMPERATURE, for example, the microprocessor 112 may at least intermittently deactivate the yellow LED in sleep mode to conserve power. The microprocessor 112 may still retain the status function of the yellow light emitting device, and may be configured to pulse or blink the yellow LED every ten seconds, for example, to indicate an ongoing duration of time in which the sensed temperature exceeds the MINIMUM LETHAL TEMPERATURE. No LOW BATTERY signal will be emitted during this sleep mode period. The microprocessor 112 is configured to control the visual indicator 108 to provide continued indication that the sensed temperature is above the MINIMUM LETHAL TEMPERATURE until the ACCUMULATED COUNT TOTAL meets the PREDETERMINED MINIMUM COUNT (or PREDETERMINED MINIMUM TIME PERIOD). Where the visual indicator 108 comprises a yellow light emitting device that was activated to indicate a sensed temperature above the MINIMUM LETHAL TEMPERATURE, for example, the microprocessor 112 continues to blink the yellow LED until the ACCUMULATED COUNT TOTAL meets the PREDETERMINED MINIMUM COUNT. During this sleep mode period, the microprocessor 112 continues to add count values to the ACCUMULATED COUNT TOTAL, which will eventually reach the PREDETERMINED MINIMUM COUNT value. Once the ACCUMULATED COUNT TOTAL calculated by the microprocessor 112 reaches the PREDETERMINED MINIMUM COUNT value, the microprocessor 112 is configured to activate the visual indicator 108 to provide an indication that the minimum heating duration required for eradication of a pest infestation has elapsed. Where the visual indicator 108 comprises a light emitting diode capable of emitting a green light, such as a green LED for example, the microprocessor 112 may activate the green LED to indicate that the minimum heating duration required for eradication of a pest infestation has elapsed.

Once the visual indicator 108 is activated to indicate the minimum heating duration required for eradication, (e.g., a green LED is illuminated, for example), the device 100, particularly the microprocessor 112 and counter function suspend any further counting and summing of the ACCUMULATED COUNT TOTAL. Thus, the counting function stops once the ACCUMULATED COUNT TOTAL indicates that the device has exceeded the PREDETERMINED MINIMUM COUNT. After reaching the PREDETERMINED MINIMUM COUNT value, the device 100 will return to sleep mode after 30 seconds transpire or the ON/OFF/RESET button 118 is momentarily depressed. Upon setting or returning to the sleep mode, the microprocessor 112 is configured to deactivate the visual indicator 108 to conserve electrical power of the battery 116. Where the visual indicator 108 comprises a green light emitting device that was activated to indicate that the minimum heating duration has elapsed, for example, the microprocessor 112 may deactivate the green LED in sleep mode to conserve power. The microprocessor 112 still retains the status function of the green light emitting device, and may be configured to pulse or blink the green LED every ten seconds, for example, to indicate that the minimum heating duration required for eradication has elapsed. The visual indicator 108 (or green LED) will continue to provide an indication that the minimum heating duration required for eradication has elapsed until the device 100 is turned off by manually depressing ON/OFF/RESET button 118 for five seconds. Turning off the device 100 will reset the count and dump the historical temperature and duration data retained in the memory 114.

A few examples of the operation of the determination of count weight and count values by the microprocessor are provided below. A total count of at least 720 has been determined to indicate a complete kill of insects similar to bedbugs in an infestation (Reference Table I). For other pests, such as scorpions, a higher temperature exposure and longer duration is required to eradicate such an infestation, utilizing a higher total count number of 1440 (Reference Table II). Note that the kill temperature is higher and the PREDETERMINED MINIMUM COUNT is higher to accomplish the eradication of the scorpion infestation.

EXAMPLE 1

A device is placed in a space already at 120° F. for two hours. The Count Weight equals 1.0 every ten seconds at this temperature. A device deployed for two hours thus accumulates 6 counts per minute at 60 minutes per hour for 2 hours, reaching 720 TOTAL COUNTS.

EXAMPLE 2

A device is placed within a space initially at room temperature and then heated to 120° F. for 10 minutes, 121° F. for 5 minutes, 122° F. for 5 minutes, 123° F. for 5 minutes, 124° F. for 5 minutes, 125° F. for 5 minutes, 126° F. for 5 minutes, 127° F. for 5 minutes, 128° F. for 5 minutes, 129° F. for 5 minutes, 130° F. for 5 minutes, 131° F. for 10 minutes, and 130° F. for 5 minutes and 40 seconds.

Using Table I, the microprocessor 112 of the device 100 is configured to realize an accumulated total count (ATC) based on the count weights for each temperature as follows:

At 116° F. for 2 minutes, 0.2 Count Weights every 10 seconds reaches 2.4 (ATC).

At 117° F. for 2 minutes, 0.4 Count Weights every 10 seconds reaches 7.2 (ATC).

At 118° F. for 4 minutes, 0.6 Count Weights every 10 seconds reaches 21.6 (ATC).

At 119° F. for 4 minutes, 0.8 Count Weights every 10 seconds reaches 40.8 (ATC).

At 120° F. for 5 minutes, 1.0 Count Weights every 10 seconds reaches 70.8 (ATC).

At 121° F. for 5 minutes, 1.06 Count Weights every 10 seconds reaches 102.6 (ATC).

At 122° F. for 5 minutes, 1.14 Count Weights every 10 seconds reaches 136.8 (ATC).

At 123° F. for 5 minutes, 1.25 Count Weights every 10 seconds reaches 174.3 (ATC).

At 124° F. for 5 minutes, 1.33 Count Weights every 10 seconds reaches 214.2 (ATC).

At 125° F. for 5 minutes, 1.41 Count Weights every 10 seconds attains 256.5 (ATC).

At 126° F. for 5 minutes, 1.5 Count Weights every 10 seconds reaches 301.5 (ATC).

At 127° F. for 5 minutes, 1.58 Count Weights every 10 seconds reaches 348.9 (ATC).

At 128° F. for 5 minutes, 1.79 Count Weights every 10 seconds reaches 402.6 (ATC).

At 129° F. for 5 minutes, 1.9 Count Weights every 10 seconds reaches 459.6 (ATC).

At 130° F. for 5 minutes, 2.0 Count Weights every 10 seconds attains 519.6 (ATC).

At 131° F. for 10 minutes, 2.22 Count Weights every 10 seconds reaches 652 (ATC).

At 130° F. for 5 minutes, 40 second, 2.0 Count Weights every 10 seconds, reaches 720 (ATC).

As shown above, the count weights listed above yields an ACCUMULATED COUNT TOTAL of 720, which meets the PREDETERMINED MINIMUM COUNT TOTAL as previously described. In this example, the device operated to track the remediation of an infested space with a Total Elapsed Run Time of 82 minutes and 40 seconds or 1 hour 22 minutes and 40 seconds.

It should be noted that tracking a time period in which the sensed temperature exceeds the MINIMUM LETHAL TEMPERATURE known to kill the particular insect or pest, up to a fixed time or PREDERMINED MINIMUM TIME PERIOD appropriate for the particular insect or pest, could also be employed in place of the PREDETERMINED MINIMUM COUNT embodiment described above. This alternate approach, while lacking the flexibility of the above described solution, would serve to meet the objective of indicating the eradication of an insect, small mammal, or other pest infestation. This alternate embodiment could be accomplished using discrete components, as opposed to a microprocessor and associated programming. However, the end results would be the same provided some equivalent means are provided to indicate that the established criteria regarding the eradication of an infestation has been met.

Having described various exemplary embodiments, components thereof, and an exemplary manner of operation, an alternate embodiment of an operation mode for indicating the eradication of a pest infestation will now be described. The alternate embodiment further includes a display device in addition to, or as part of, the visual indicator. The display device may comprise a single display device or three display devices, or other suitable equivalents to provide for indicating additional information to the operator. In this example, the device 200 detects a sensed temperature exceeding the MINIMUM LETHAL TEMPERATURE and activates the visual indicator 208 to indicate the temperature exceeding the MINIMUM LETHAL TEMPERATURE and the start of eradication. For example, the device 200 may deactivate an initially illuminated red LED and activate a yellow LED, and initiate a clock or timer for providing the display of elapsed time information on at least one display device. For example, a yellow LED could be illuminated until a timer achieves a PREDETERMINED MINIMUM TIME PERIOD. The device 200 may also be configured to sum one or more count values and display an ACCUMULATED TOTAL COUNT on at least one display device as long as temperature remains above MINIMUM LETHAL TEMPERATURE. During this time, any temperature below MINIMUM LETHAL TEMPERATURE would reset elapsed timer and the ACCUMULATED TOTAL COUNT value to zero. After the ACCUMULATED TOTAL COUNT value reaches the PREDETERMINED MINIMUM COUNT VALUE, the device 200 may be configured to activate an visual indicator, such as a green light emitting device or LED, and deactivate the yellow LED and counter. During deployment of the device 200 programmed with this alternate mode of operation, the user can reset the elapsed time and ACCUMULATED TOTAL COUNT counter to zero, or some other start value, by holding down the reset button 218 for at least five seconds. Depressing the reset button 218 for the time interval overrides the function of the timers described above.

According to another aspect of the present disclosure, a method for controlling a device for indicating the eradication of a pest infestation is provided. The method comprises sensing the temperature proximate the sensor and providing a signal that is indicative of the sensed temperature. The method further includes using a microprocessor connected to the sensor for periodically receiving from the sensor a signal that is indicative of the sensed temperature, and for determining whether the sensed temperature exceeds a minimum lethal temperature using the microprocessor to monitor a running time duration in which the sensed temperature exceeds the minimum lethal temperature; and determining when the running time duration has exceeded a predetermined time required for eradication of a pest infestation. The method further comprises using the microprocessor to activate a visual indicator when the running time duration in which the sensed temperature exceeds the minimum lethal temperature has reached the predetermined time required for eradication, to thereby transform the microprocessor determination of the minimum time duration into a visible indication that the predetermined time required for eradication of a pest infestation has elapsed.

From the aforementioned description, various embodiments of devices for indicating fatality or eradication of insect, small mammal, or other pest infestations have been described. The described exemplary embodiments of devices are uniquely capable of transforming the time elapsed at a given sensed temperature by assigning a weighted count to the temperature reading. The described exemplary embodiments of devices then accumulate the weighted count values until a sum, or PREDETERMINED MINIMUM COUNT VALUE is reached. The described exemplary embodiments of devices are configured to illuminate an visual indicator, such as colored lights, to indicate whether the MINIMUM LETHAL TEMPERATURE or PREDETERMINED MINIMUM COUNT VALUE has been reached. The described exemplary embodiments of devices may use materials and various components that may be manufactured from many materials including, but not limited to, polymers, high density polyethylene HDPE, polypropylene PP, polyvinyl chloride PVC, nylon, ferrous and non-ferrous metals, their alloys and composites.

Though these temperature, count weights, and PREDETERMINED MINIMUM COUNT VALUE settings are preferred, the described exemplary embodiments of devices, through their microprocessors, can be reprogrammed for other temperatures and durations typically through the programming port, such as a USB jack described above. The described exemplary embodiments of devices may be further configured to actively control operation of a heating device. For example, a device may be utilized in combination with a heating device for heating a space, and may be configured to deactivate operation of the heating device. Upon completion of the minimum heating duration required for eradication of a pest infestation, the device may be configured to communicate a signal that causes the heating device to discontinue heating operation, such as by signaling a relay or other device that disconnects power to the heating device, to thereby discontinue heating operation.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A device adapted to monitor a space being heated for the purpose of eradicating a pest infestation, the device comprising:

a sensor configured to sense the temperature proximate the sensor and to provide a signal that is indicative of the sensed temperature proximate the sensor;

a visual indicator configured to provide a visible indication of status; and a microprocessor connected to the sensor, the microprocessor being configured to determine whether the sensed temperature exceeds a minimum lethal temperature and to responsively activate the visual indicator to provide a visible indication of minimum lethal temperature, wherein the microprocessor is further configured to determine whether completion has occurred of a minimum heating duration during which the sensed temperature exceeds the minimum lethal temperature, and to responsively activate the visual indicator to provide a visible indication that the minimum heating duration required for eradication of a pest infestation has elapsed;

wherein the microprocessor is configured to determine completion of the minimum heating duration for eradication by determining from each sensed temperature received from the sensor a count value that is based on the sensed temperature value, and by determining when a sum of the count values has reached a predetermined minimum count required for eradication of the pest infestation.

2. The device of claim 1, wherein the microprocessor is configured to determine completion of the minimum heating duration for eradication by determining whether a predetermined period of time has elapsed in which the sensed temperature exceeds the minimum lethal temperature, wherein the predetermined time period is between about one-half hour and about ten hours.

3. The device of claim 1, wherein the microprocessor is configured to assign a weight factor based on the sensed temperature and use the weight factor in calculating a count value for each segment of time in which a sensed temperature is received.

4. A device for indicating the eradication of a pest infestation, the device comprising:

a sensor configured to sense the temperature proximate the sensor and provide a signal that is indicative of the sensed temperature proximate the sensor;

a visual indicator configured to provide a visible indication of the status of the device; and a microprocessor connected to the sensor and configured to periodically receive from the sensor a signal that is indicative of the sensed temperature, the microprocessor being further configured to determine the occurrence of:

a sensed temperature that exceeds a minimum lethal temperature, and completion of a minimum heating duration for eradication during which the sensed temperature exceeds the minimum lethal temperature;

a connector configured to connect the device to an external device, to permit communication to the device of information relating to programming of the microprocessor and information relating to calibration of the sensor;

wherein the microprocessor is configured to activate the visual indicator subsequent to a determination of completion of the minimum heating duration for eradication, to thereby provide a visible indication that the minimum heating duration required for eradication of a pest infestation has elapsed.

5. The device of claim 4, wherein the microprocessor is configured to determine completion of the minimum heating duration for eradication by determining whether a predetermined period of time has elapsed in which the sensed temperature exceeds the minimum lethal temperature, wherein the predetermined time period is between about one-half hour and about ten hours.

6. The device of claim 4, wherein the device further includes a printed circuit board that connects the microprocessor, the sensor, and the visual indicator.

7. The device of claim 4, further comprising a display device in communication with the microprocessor, wherein the display device is configured to display at least one of a sensed temperature value and an elapsed time value.

8. The device of claim 4, further comprising a switch coupled to an electrical power source and the microprocessor, wherein the switch is configured to selectively connect the electrical power source to the microprocessor to activate the microprocessor, and configured to selectively disconnect the electrical power source from the microprocessor to cause the microprocessor to reset when the switch is actuated for more than a predetermined amount of time.

9. The device of claim 4, wherein the microprocessor is configured to operate in a sleep mode that conserves electrical power by at least intermittently deactivating the visual indicator after a predetermined time of continuous device operation.

10. The device of claim 4, further comprising a transmitter that is coupled to the microprocessor and configured to wirelessly transmit signals, to allow download of sensed temperature data to a remote monitoring device.

11. The device of claim 4 in combination with a heating device for heating a space, where upon completion of the minimum heating duration required for eradication of a pest infestation, the device is configured to communicate a signal that causes the heating device to discontinue heating operation.

12. The device of claim 4, wherein the connector comprises a programming jack that allows for connection of a computer cable to the device for transmission of programming instructions to the microprocessor.

13. The device of claim 4, wherein the visual indicator comprises one or more light emitting devices connected to the microprocessor, wherein the microprocessor is configured to activate at least one of the one or more light emitting devices to provide indication of operating status.

14. The device of claim 13, wherein the microprocessor is configured to activate at least one light emitting device to provide an indication that the sensed temperature is above the minimum lethal temperature or an indication that the minimum application of heat required for eradication has elapsed.

15. A device for indicating the eradication of a pest infestation, the device comprising:

a sensor configured to sense the temperature proximate the sensor and provide a signal that is indicative of the sensed temperature proximate the sensor;

a visual indicator configured to provide a visible indication of the status of the device; and a microprocessor connected to the sensor and configured to periodically receive from the sensor a signal that is indicative of the sensed temperature, the microprocessor being further configured to determine the occurrence of:

a sensed temperature that exceeds a minimum lethal temperature, and completion of a minimum heating duration for eradication during which the sensed temperature exceeds the minimum lethal temperature;

wherein the microprocessor is configured to activate the visual indicator subsequent to a determination of completion of the minimum heating duration for eradication, to thereby provide a visible indication that the minimum heating duration required for eradication of a pest infestation has elapsed; and wherein the microprocessor is configured to determine completion of the minimum heating duration for eradication by determining from each sensed temperature received from the sensor a count value that is based on the sensed temperature value, and by determining when a sum of the count values has reached a predetermined minimum count required for eradication of the pest infestation.

16. The device of claim 15, wherein the microprocessor is configured to determine the count value at time intervals of between about 10 seconds and about 2 minutes.

17. The device of claim 16, further comprising an electronic memory associated with the microprocessor, wherein the microprocessor is configured to store the sum of the count values in the electronic memory in a manner such that each time a sensed temperature is received from the sensor, the microprocessor determines a present count value associated with the sensed temperature and thereafter determines an updated sum of the present count value and a previously stored sum, which updated sum is stored in the electronic memory.

18. A device for indicating the eradication of a pest infestation, the device comprising:
   a sensor configured to sense the temperature proximate the sensor and provide a signal that is indicative of the sensed temperature proximate the sensor;
   a visual indicator configured to provide a visible indication of the status of the device; and
   a microprocessor connected to the sensor and configured to periodically receive from the sensor a signal that is indicative of the sensed temperature, the microprocessor being further configured to determine the occurrence of:
      a sensed temperature that exceeds a minimum lethal temperature, and
      completion of a minimum heating duration for eradication during which the sensed temperature exceeds the minimum lethal temperature;
   a cover secured to the device, wherein the sensor is a temperature probe that depends from the cover and is connected to a control via a connector port that connects the sensor and the microprocessor;
   wherein the microprocessor is configured to activate the visual indicator subsequent to a determination of completion of the minimum heating duration for eradication, to thereby provide a visible indication that the minimum heating duration required for eradication of a pest infestation has elapsed.

19. The device of claim 18, further comprising a connector configured to connect the device to an external device, to permit communication to the device of information relating to programming of the microprocessor and information relating to calibration of the sensor.

20. A device for indicating the eradication of a pest infestation, the device comprising:
   a sensor configured to sense the temperature proximate the sensor and provide a signal that is indicative of the sensed temperature proximate the sensor;
   a visual indicator configured to provide a visible indication of the status of the device; and
   a microprocessor connected to the sensor and configured to periodically receive from the sensor a signal that is indicative of the sensed temperature, the microprocessor being further configured to determine the occurrence of:
      a sensed temperature that exceeds a minimum lethal temperature, and
      completion of a minimum heating duration for eradication during which the sensed temperature exceeds the minimum lethal temperature;
   a cover secured to the device, wherein the cover encloses at least a portion of the sensor and includes at least one opening therein proximate the sensor, to allow ambient air to pass through the at least one opening and thereby permit the sensor to sense the temperature of air proximate the device;
   wherein the microprocessor is configured to determine completion of a minimum heating duration for eradication by determining whether a predetermined period of time has elapsed in which the sensed temperature exceeds the minimum lethal temperature, wherein the predetermined time period is between about one-half hour and about ten hours; and
   wherein the microprocessor is configured to activate the visual indicator subsequent to a determination of completion of the minimum heating duration for eradication, to thereby provide a visible indication that the minimum heating duration required for eradication of a pest infestation has elapsed.

21. A method for indicating the eradication of a pest infestation within space to be heated for the purpose of eradicating the pest infestation, the method comprising:
   periodically receiving a signal indicative of a sensed temperature within the space being heated for the purpose of eradicating the pest infestation;
   determining whether the sensed temperature exceeds a minimum lethal temperature;
   monitoring a running time duration in which the sensed temperature exceeds the minimum lethal temperature; and
   activating a visual indicator when the running time duration in which the sensed temperature exceeds the minimum lethal temperature has reached a predetermined time required for eradication of the pest infestation, to thereby transform the determination of the time duration into a visible indication that the predetermined minimum time required for eradication of a pest infestation has elapsed;
   wherein the method includes:
      determining a count value based on the sensed temperature value as indicated by the periodically received signal;
      determining when a sum of the count values has reached a predetermined minimum count required for eradication of the pest infestation; and
      activating the visual indicator when the sum of the count values has reached the predetermined minimum count required for eradication of the pest infestation.

22. The method of claim 21, wherein activating the visual indicator includes activating at least one light emitting source.

23. The method of claim 21, further comprising communicating a signal to a heating device being used for heating the space for the purpose of eradicating the pest infestation, such that the heating device discontinues the heating operation when the running time duration in which the sensed temperature exceeds the minimum lethal temperature has reached the predetermined time required for eradication of the pest infestation.

24. The method of claim 21, wherein the method includes heating the space for the purpose of eradicating the pest infestation until the running time duration in which the sensed temperature exceeds the minimum lethal temperature has reached the predetermined time required for eradication of the pest infestation.

25. The method of claim 21, wherein the method includes:
determining whether a predetermined period of time has elapsed in which the sensed temperature exceeds the minimum lethal temperature; and
activating the visual indicator when the predetermined period of time has elapsed.

26. A method for controlling a device for indicating the eradication of a pest infestation, the method comprising:
sensing a temperature proximate a sensor, which provides a signal indicative of the sensed temperature;
using a microprocessor connected to the sensor for periodically receiving from the sensor the signal that is indicative of the sensed temperature;
using the microprocessor to determine whether the sensed temperature exceeds a minimum lethal temperature;
using the microprocessor to monitor a running time duration in which the sensed temperature exceeds the minimum lethal temperature; and
using the microprocessor to activate a visual indicator when the running time duration in which the sensed temperature exceeds the minimum lethal temperature has reached a predetermined time required for eradication, to thereby transform the microprocessor determination of the running time duration into a visible indication that the predetermined time required for eradication of a pest infestation has elapsed; wherein the method includes:
determining a count value based on the sensed temperature value as indicated by the periodically received signal;
determining when a sum of the count values has reached a predetermined minimum count required for eradication of the pest infestation; and
activating the visual indicator when the sum of the count values has reached the predetermined minimum count required for eradication of the pest infestation.

* * * * *